United States Patent
Edlinger

(10) Patent No.: US 6,855,189 B2
(45) Date of Patent: Feb. 15, 2005

(54) METHOD FOR REMOVING CHROME AND/OR NICKEL FROM LIQUID SLAGS

(75) Inventor: Alfred Edlinger, Bartholomäberg (AT)

(73) Assignee: Holcim Ltd., Jona (CH)

(*) Notice: Subject to any disclaimer, the term of this patent is extended or adjusted under 35 U.S.C. 154(b) by 68 days.

(21) Appl. No.: 10/182,028

(22) PCT Filed: Jan. 18, 2001

(86) PCT No.: PCT/AT01/00012

§ 371 (c)(1),
(2), (4) Date: Oct. 28, 2002

(87) PCT Pub. No.: WO01/55461

PCT Pub. Date: Aug. 2, 2001

(65) Prior Publication Data

US 2003/0075019 A1 Apr. 24, 2003

(30) Foreign Application Priority Data

Jan. 28, 2000 (AT) .......................................... 63/2000 U

(51) Int. Cl.⁷ .......................... C22B 23/00; C22B 34/32
(52) U.S. Cl. ............................. 75/623; 75/629; 420/590
(58) Field of Search ................... 75/623, 629; 420/590

(56) References Cited

U.S. PATENT DOCUMENTS

| | | | | |
|---|---|---|---|---|
| 4,001,012 A | * | 1/1977 | Rote et al. | 75/512 |
| 5,302,184 A | * | 4/1994 | Batterham et al. | 75/501 |
| 6,409,793 B1 | * | 6/2002 | Edlinger | 75/10.35 |
| 6,679,931 B1 | * | 1/2004 | Gotzinger et al. | 75/10.35 |

FOREIGN PATENT DOCUMENTS

JP 54-158313 A 12/1979

* cited by examiner

*Primary Examiner*—Melvyn Andrews
(74) *Attorney, Agent, or Firm*—Chapman and Cutler LLP

(57) ABSTRACT

In a method for removing chromium oxide and nickel oxide, and combinations thereof, from liquid slags or slag mixtures, in which the liquid slag is A charged onto a metal bath, in particular an iron bath, and reduced by feeding carbon or carbon carriers, the carbon feed into the metal bath is effected until a decrease of the Cr and/or Ni oxide contents of the slag to a value of between 0.8 wt.-% and 0.2 wt.-%. As the pregiven Cr and/or Ni oxide content range of the slag is reached, reductants having higher reduction potentials such as, e.g., Al, Ca, Si, Fe—Si or Ca—Si are added in order to lower the Cr and/or Ni oxide contents to below 0.15 wt.-%, preferably below 0.08 wt.-%.

12 Claims, No Drawings

METHOD FOR REMOVING CHROME AND/OR NICKEL FROM LIQUID SLAGS

The invention relates to a method for removing chromium oxide and nickel oxide, and combinations thereof, from liquid slags or slag mixtures and dusts, in which the liquid slag is charged onto a metal bath, in particular an iron bath, and reduced by feeding carbon or carbon carriers.

Liquid steelworks slags derived from the production of special steels or ferrochromium, depending on their origin and, in particular, on the portion and composition of the scrap admixtures applied in the production of steel, above all contain relatively high amounts of chromium oxide. Also manganese oxides are found in relatively high amounts. In certain steel slags, even relatively high nickel and relatively high vanadium contents are observed. In the case of steel slags having relatively high vanadium contents, it has already been proposed in EP 770 149 to recover, after a first reduction process using carbon carriers, vanadium in a separate consecutively arranged reduction converter using reductants having higher reduction potentials. To this end, all of the chromium and manganese was, at first, reduced carbothermally, wherefor the slag was treated over an extended period of time above a metal bath into which carbon carriers such as, for instance, methane gas were injected. A quite considerable portion of the amount of carbon introduced was consumed in order to maintain the necessary temperatures because of the relatively long treatment time proposed.

The use of a separate reduction reactor which, as a rule, also was to be heated separately, for the separation of vanadium naturally will be economically effective only if vanadium is present in accordingly high amounts with the economy resulting from the value of the recovered vanadium. If, in the first place, the dechroming of steel slags to as large an extent as possible is to be envisaged, this will involve relatively long treatment times and hence relatively high thermal losses in the known mode of procedure.

The invention aims to enhance a method of the initially defined kind to the extent that the safe dechroming under the simultaneous reduction of the overall treatment time will be feasible even if economic benefits from the recovery of expensive metallic raw materials cannot be ensured. To solve this object, the method according to the invention essentially consists in that the carbon feed into the metal bath is effected until a decrease of the Cr and/or Ni oxide contents of the slag to a value of between 0.8 wt.-% and 0.2 wt.-% and that, upon attainment of the pregiven Cr oxide content range of the slag, reductants having higher reduction potentials such as, e.g., Al. Ca, Si, Fe—Si or Ca—Si are added in order to lower the Cr and/or Ni oxide contents to below 0.15 wt.-%, preferably below 0.08 wt.-%. The method according to the invention is, thus, carried out using but a single converter, wherein, due to the fact that the carbothermal reduction using carbon carriers such as, e.g., hydrocarbons is stopped already at a point of time at which the slag has still a relatively high chromium or Ni oxide content which, as a rule, is unacceptable to the effect that such slags cannot be directly used as cement grinding additives, the treatment time is substantially shortened until that point of time and, due to the fact that upon attainment of such predefined and relatively high chromium and/or Ni oxide contents reductants having higher reduction potentials are then immediately added in the same converter, it is feasible to complete the method within a relatively short period of time and bring the chromium and/or Ni oxide contents safely below the pregiven limit values. By such a stepwise reduction, it is, of course, feasible to lower the contents of also other special steel accompanying elements such as, e.g., molybdenum or vanadium in the slags to noncritical values.

In this respect, within the context of the method according to the invention, it is advantageous if the addition of Fe—Si is effected in amounts ranging from 3 to 15 kg/ton slag, preferably 6 to 10 kg/ton slag. If other substances capable of being reduced by such reductants were contained in the slag, such as, for instance, vanadium oxide, manganese oxide, nickel oxide or molybdenum oxide, these are, of course, simultaneously reduced into the bath in this method step.

The reduced slag formed as a result of the carbothermal reduction reacts relatively slowly with the subsequently introduced reductant, wherein the speed of the reaction and, in particular, the reduction kinetics may be substantially enhanced if, as in accordance with a preferred further development of the invention, the bath is flushed with an inert gas after the addition of the reductants having higher reduction potentials. Due to the stirring action exerted by the injected inert gas, which may be comprised of, for instance, nitrogen or argon, the reaction is substantially accelerated such that extremely short treatment times will do for obtaining the final chromium oxide contents sought.

In the main, it is advantageous to proceed in a manner where the first carbothermal reduction is carried out over a period of 15 to 30 minutes and the second reduction is carried out over a period of 3 to 10 minutes.

In the following, the invention will be explained in more detail by way of an exemplary embodiment.

EXEMPLARY EMBODIMENT

In a converter, 3 tons of a slag having the compositional analysis indicated below is charged in the liquid state onto 10 tons of pig iron:

| STEEL SLAG | |
|---|---|
| | wt.-% |
| CaO | 47.8 |
| $SiO_2$ | 26.3 |
| $Al_2O_3$ | 5.9 |
| MgO | 8.9 |
| $TiO_2$ | 1.3 |
| Feo | 1.7 |
| MnO | 1.4 |
| $Cr_2O_3$ | 6.7 |

The metal oxide contents by the simultaneous charging of carbon and oxygen were subsequently lowered to the following contents:

| METAL OXIDE CONTENTS AFTER CARBOTHERMAL REDUCTION | |
|---|---|
| | wt.-% |
| FeO | 1.1 |
| MnO | 0.8 |
| $Cr_2O_3$ | 0.3 |

After this, the addition of 30 kg ferrosilicon and the flushing of the bath with 55 $Nm^3$ nitrogen were effected over a period of 5 minutes. The reduction effect of the silicon dissolved in the iron bath produced the following final slag composition:

| SLAG AFTER STRONG REDUCTION | |
|---|---|
| | wt.-% |
| CaO | 41.6 |
| $SiO_2$ | 35.1 |
| $Al_2O_3$ | 12.8 |
| MgO | 7.5 |
| $TiO_2$ | 1.1 |
| FeO | 0.8 |
| MnO | 0.4 |
| $Cr_2O_3$ | 0.07 |

It was feasible to perform the entire two-stage reduction process in one converter, whereby a chromium oxide content of 0.3 wt.-% was found after a treatment time of 20 minutes, departing from a chromium oxide content of 6.7 wt.-% at the end of the carbothermal reaction. In the subsequent silicothermal reduction over a period of 5 minutes, the chromium oxide content could be lowered from 0.3 wt.-% to 0.07 wt.-%. On account of the relatively short treatment time, the thermal losses could be substantially lowered and the carbon carriers fed could be utilized for the reduction to a higher extent.

What is claimed is:

1. A method for removing chromium oxide and nickel oxide, and combinations thereof, from liquid slag, comprising the steps:

charging liquid slag onto a metal bath;

reducing said liquid slag by feeding at least one of the group consisting of carbon and carbon carriers into the metal bath, until the combined chromium oxide and nickel oxide content of the liquid slag has decreased to between $O_2$ and 0.8 percent by weight; and further reducing said liquid slag by adding at least one reductant having a higher reduction potential to further decrease the combined chromium oxide and nickel oxide content of the liquid slag to below 0.15 percent by weight.

2. A method according to claim 1, wherein the at least one reductant having a higher reduction potential than the carbon and carbon carriers is at least one of the group consisting of Al, Ca, Si, Fe—Si and Ca—Si.

3. A method according to claim 1, wherein the at least one reductant having a higher reduction potential than the carbon and carbon carriers is Fe—Si, and wherein said Fe—Si is added to the liquid slag in an amount ranging from 3 to 15 kg/ton liquid slag.

4. A method according to claim 2, wherein the at least one reductant having a higher reduction potential than the carbon and carbon carriers is Fe—Si, and wherein said Fe—Si is added to the liquid slag in an amount ranging from 3 to 15 kg/ton liquid slag.

5. A method according to claim 1, wherein the metal bath is flushed with an inert gas after the addition of at least one reductant having a higher reduction potential than the carbon and carbon carriers.

6. A method according to claim 2, wherein the metal bath is flushed with an inert gas after the addition of at least one reductant having a higher reduction potential than the carbon and carbon carriers.

7. A method according to claim 3, wherein the metal bath is flushed with an inert gas after the addition of Fe—Si.

8. A method according to claim 1, wherein the reduction of the liquid slag by feeding at least one of the group consisting of carbon and carbon carriers into the metal bath is carried out over a time period of 15 to 30 minutes, and wherein the reduction by at least one reductant having a higher reduction potential than the carbon and carbon carriers is carried out over a time period of 3 to 10 minutes.

9. A method according to claim 2, wherein the reduction of the liquid slag by feeding one or more of the group consisting of carbon and carbon carriers into the metal bath is carried out over a time period of 15 to 30 minutes, and wherein the reduction by at least one reductant having a higher reduction potential than the carbon and carbon carriers is carried out over a time period of 3 to 10 minutes.

10. A method according to claim 3, wherein the reduction of the liquid slag by feeding one or more of the group consisting of carbon and carbon carriers into the metal bath is carried out over a time period of 15 to 30 minutes, and wherein the reduction by Fe—Si is carried out over a time period of 3 to 10 minutes.

11. A method according to claim 5, wherein the reduction of the liquid slag by feeding one or more of the group consisting of carbon and carbon carriers into the metal bath is carried out over a time period of 15 to 30 minutes, and wherein the reduction by at least one reductant having a higher reduction potential than the carbon and carbon carriers is carried out over a time period of 3 to 10 minutes.

12. A method according to claim 7, wherein the reduction of the liquid slag by feeding one or more of the group consisting of carbon and carbon carriers into the metal bath is carried out over a time period of 15 to 30 minutes, and wherein the reduction by Fe—Si is carried out over a time period of 3 to 10 minutes.

* * * * *

UNITED STATES PATENT AND TRADEMARK OFFICE
CERTIFICATE OF CORRECTION

PATENT NO. : 6,855,189 B2
DATED : February 15, 2005
INVENTOR(S) : Edlinger

It is certified that error appears in the above-identified patent and that said Letters Patent is hereby corrected as shown below:

Column 3,
Line 35, delete "$O_2$" and insert -- 0.2 --.

Signed and Sealed this

Sixth Day of September, 2005

JON W. DUDAS
*Director of the United States Patent and Trademark Office*